No. 872,751. PATENTED DEC. 3, 1907.
W. F. ROTHE.
PNEUMATIC MOTOR.
APPLICATION FILED JUNE 12, 1906.

7 SHEETS—SHEET 1.

No. 872,751. PATENTED DEC. 3, 1907.
W. F. ROTHE.
PNEUMATIC MOTOR.
APPLICATION FILED JUNE 12, 1906.

7 SHEETS—SHEET 2.

No. 872,751. PATENTED DEC. 3, 1907.
W. F. ROTHE.
PNEUMATIC MOTOR.
APPLICATION FILED JUNE 12, 1906.

7 SHEETS—SHEET 3.

No. 872,751. PATENTED DEC. 3, 1907.
W. F. ROTHE.
PNEUMATIC MOTOR.
APPLICATION FILED JUNE 12, 1906.
7 SHEETS—SHEET 5.
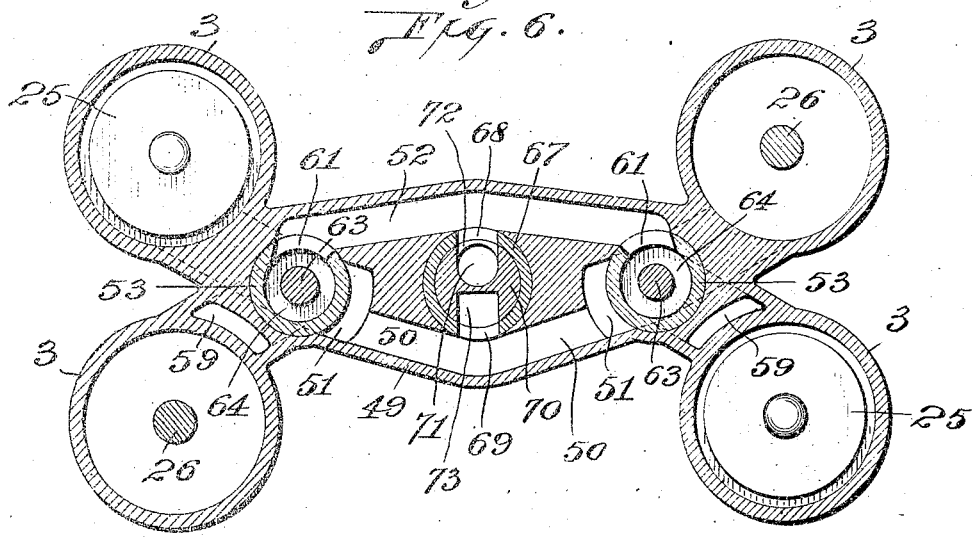
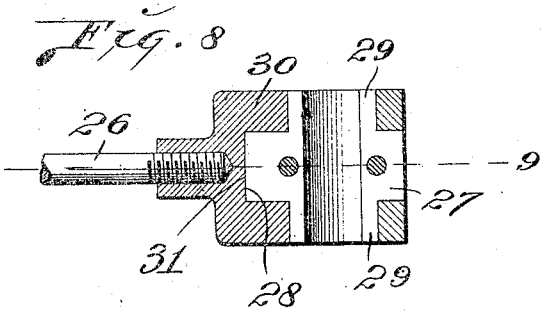
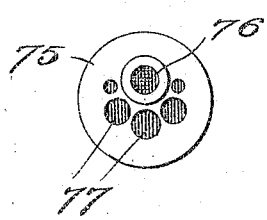
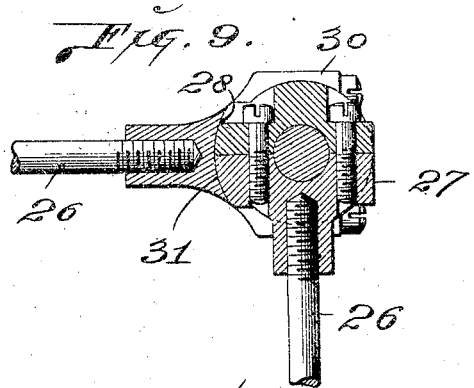
Attest,
M. P. Smith
H. J. Fletcher
Inventor,
Wm. F. Rothe.
By Higdon & Longan
Attys.

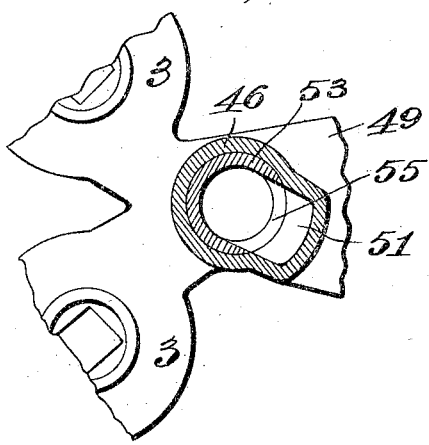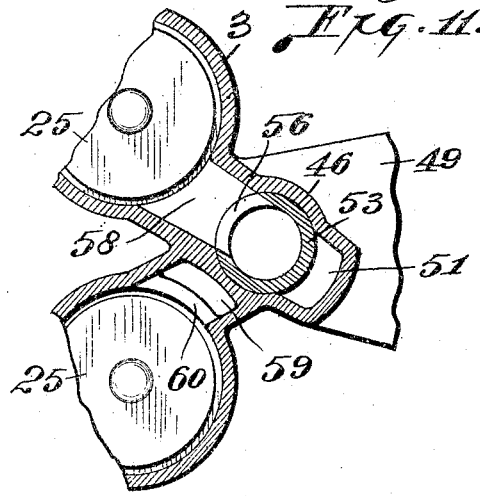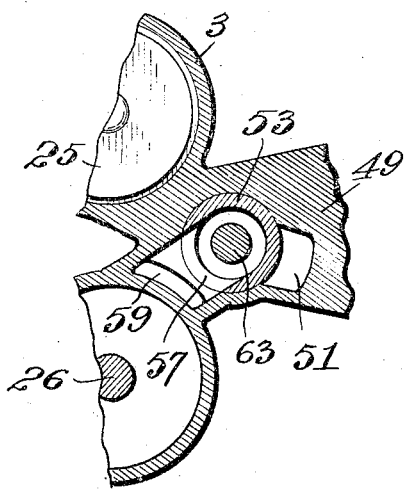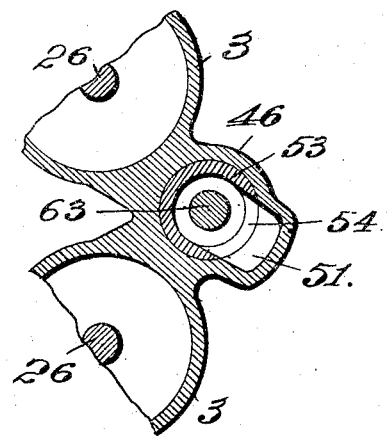

No. 872,751.
PATENTED DEC. 3, 1907.
W. F. ROTHE.
PNEUMATIC MOTOR.
APPLICATION FILED JUNE 12, 1906.
7 SHEETS—SHEET 7.
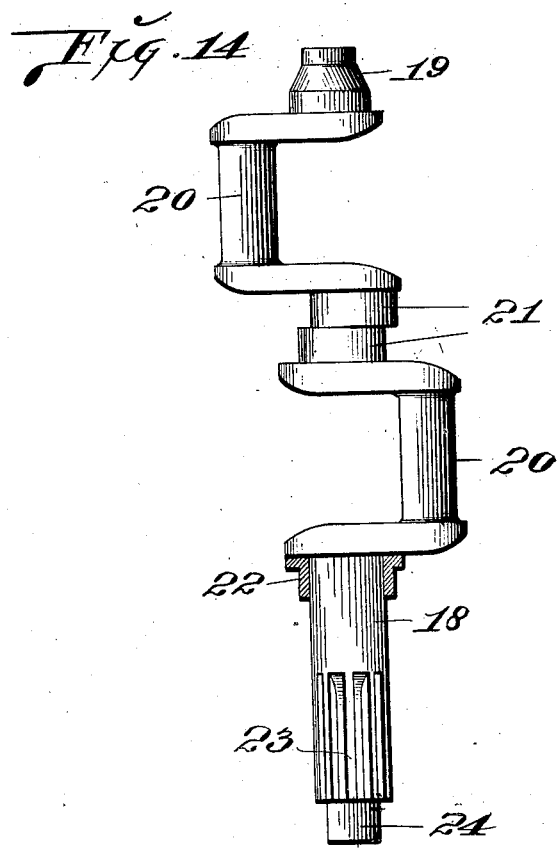
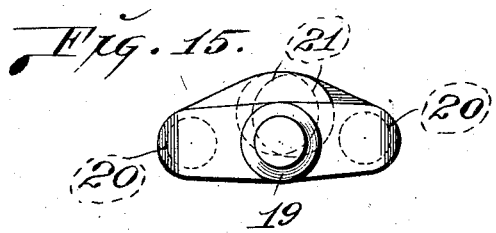

UNITED STATES PATENT OFFICE.

WILLIAM F. ROTHE, OF EAST ST. LOUIS, ILLINOIS.

PNEUMATIC MOTOR.

No. 872,751.

Specification of Letters Patent.

Patented Dec. 3, 1907.

Application filed June 12, 1906. Serial No. 321,390.

*To all whom it may concern:*

Be it known that I, WILLIAM F. ROTHE, a citizen of the United States, and resident of East St. Louis, St. Clair county, Illinois, have invented certain new and useful Improvements in Pneumatic Motors, of which the following is a specification containing a full, clear, and exact description, reference being had to the accompanying drawings, forming a part hereof.

My invention relates generally to pneumatic motors, and more particularly to a motor or engine to be operated by compressed air, and to be used for drilling, reaming, and tapping.

The principal objects of my invention are as follows: First: to construct a simple, light, and strong motor, or engine, to be operated by compressed air and which is provided with a casing that may be readily taken apart, in order that the internal parts of the motor may be inspected, adjusted, and repaired; second: to arrange a crank shaft in the motor, and to provide ball bearings for the same, one of which is adjustable, in order to take up any longitudinal wear or lost motion of said crank shaft; third: to provide a simple and efficient throttle valve, whereby the motor can be stopped, started, or reversed; and which is conveniently located and easily manipulated; fourth: to arrange a pair of main inlet valves between each pair of engine cylinders, thereby bringing the fluid pressure supply very close to the pistons, thus reducing the dead air space or clearance to a minimum; fifth, to arrange on the interior of the motor a planetary gearing, by means of which the rotary motion of the crank shaft is imparted to the tool socket, which planetary gearing is compact, easily placed in or removed from position, and may be readily inspected and repaired.

To the above purposes, my invention consists in certain novel features of construction and arrangement of parts, which will be hereinafter more fully set forth, pointed out in the claims, and illustrated in the accompanying drawings, in which:—

Figure 1:
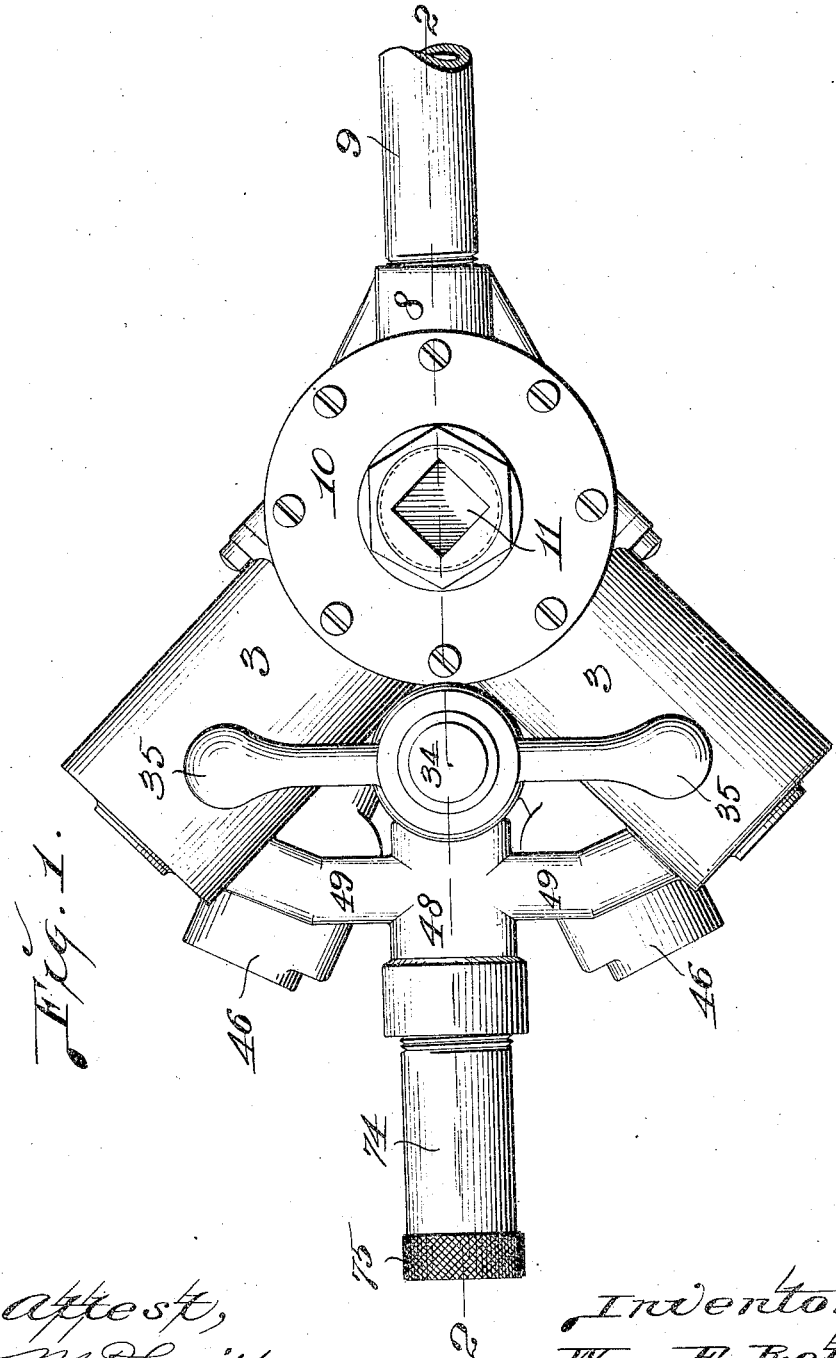
Figure 2:
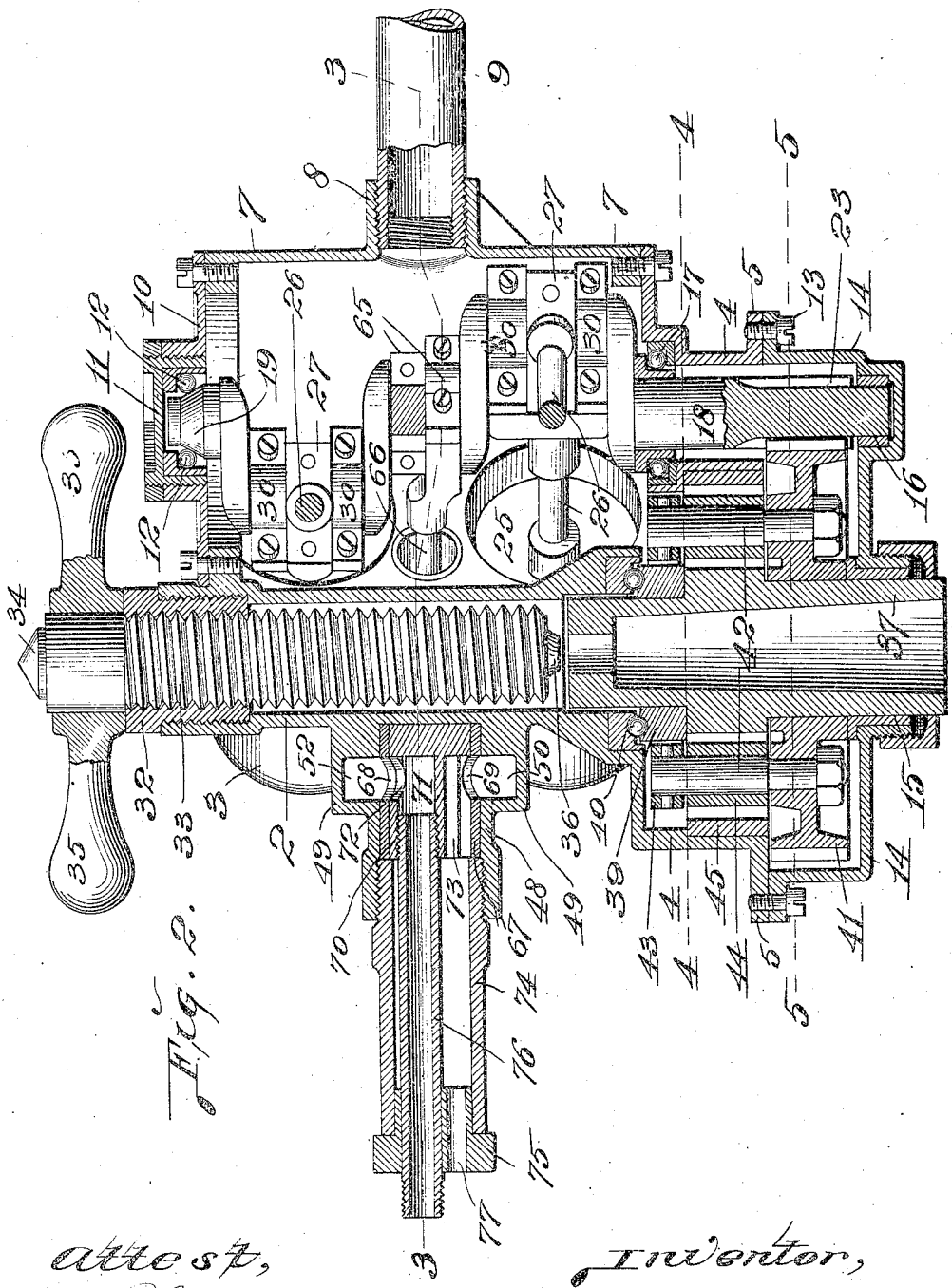
Figure 3:
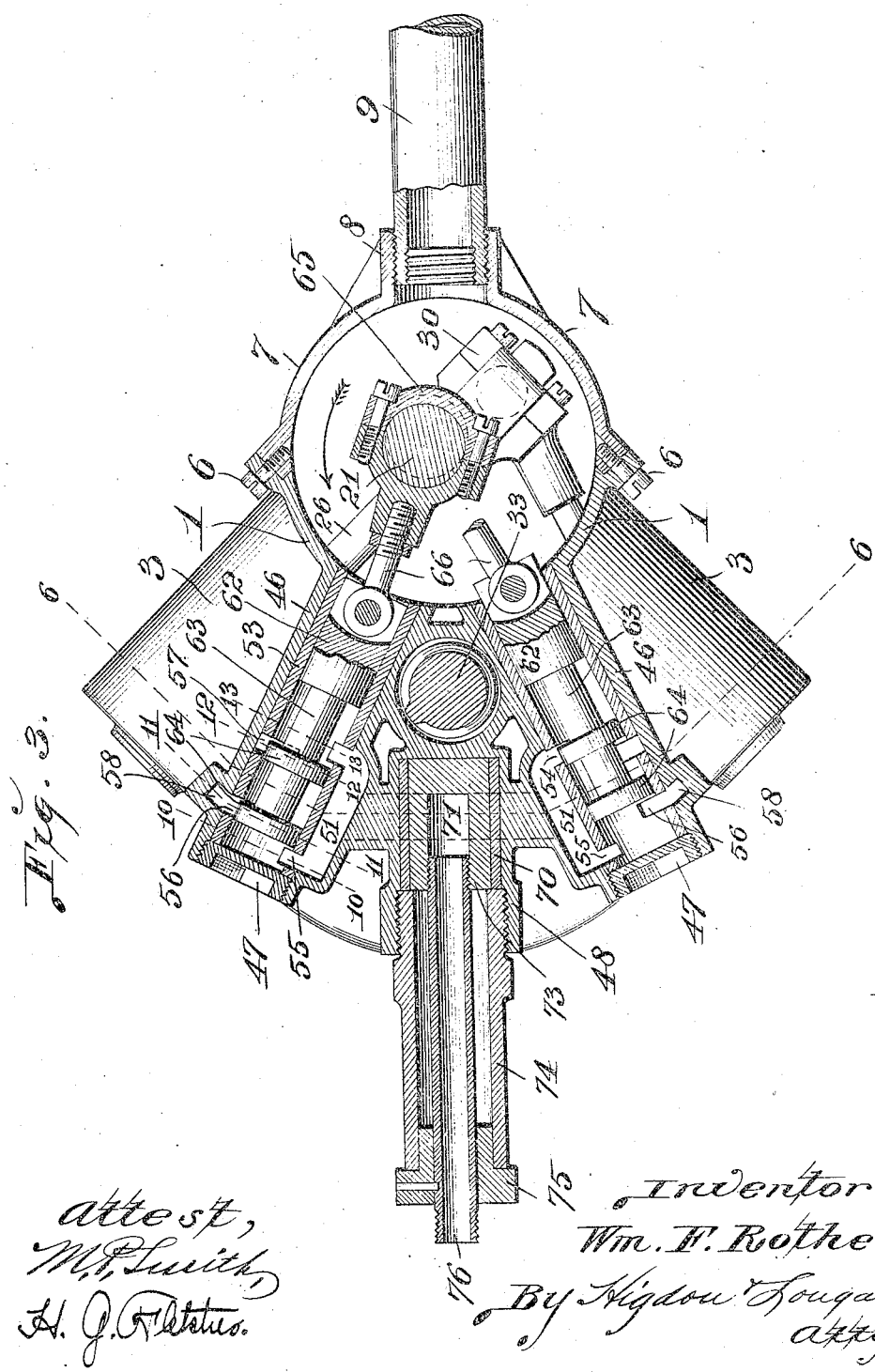
Figure 4:
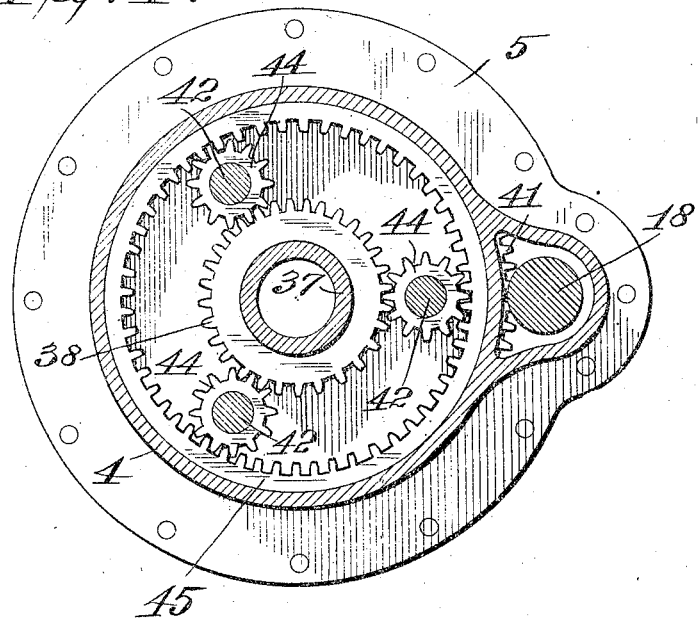
Figure 5:
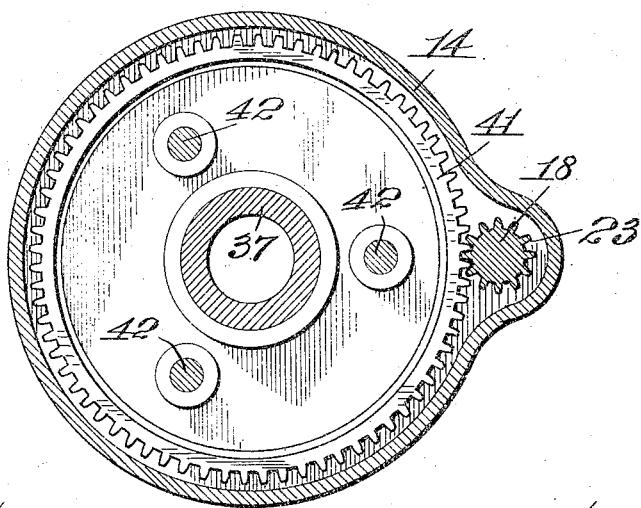

Figure 1 is a plan view of a pneumatic motor of my improved construction; Fig. 2 is a vertical section taken on the line 2—2 of Fig. 1; Fig. 3 is a horizontal section taken on the line 3—3 of Fig. 2; Fig. 4 is a horizontal section taken on the line 4—4 of Fig. 2; Fig. 5 is a horizontal section taken on the line 5—5 of Fig. 2; Fig. 6 is a diagrammatic cross section taken on the line 6—6 of Fig. 3; Fig. 7 is an end elevation of one of the handles by means of which the motor is manipulated, and showing the fluid pressure inlet tube and exhaust openings in said handle; Fig. 8 is a horizontal section taken through the center of the pair of journal boxes that is mounted on each crank of the crank shaft; Fig. 9 is a vertical section taken on the line 9—9 of Fig. 8; Fig. 10 is a detail section taken on the line 10—10 of Fig. 3; Fig. 11 is a detail section taken on the line 11—11 of Fig. 3; Fig. 12 is a detail section taken on the line 12—12 of Fig. 3; Fig. 13 is a detail section taken on the line 13—13 of Fig. 3; Fig. 14 is a side elevation of the crank shaft made use of in my improved motor; Fig. 15 is a plan view of the crank shaft.

The main portion of the motor casing comprises a vertically disposed cylindrical plate 1, and arranged on the front side thereof and integral therewith is a tubular casing 2, in which the feed screw of the device operates. Formed integral with the cylindrical plate 1 on each side of the tubular casing 2, and at right angles to each other is a pair of cylinders 3, the outer ends of which are closed. Formed integral with the lower end of the plate 1 and the tubular casing 2 is a cylindrical casing 4, the lower end of which is provided with an integral outwardly projecting flange 5. Detachably secured to the side edges of the plate 1 and to the top of a portion of the casing 4 by means of screws 6, is a cylindrical plate 7, which, together with the plate 1, forms a cylindrical chamber in which the crank shaft of the motor operates.

Integral with the outer face and central portion of this plate 7 is a socket 8, in which a handle 9 is detachably seated. The top of the cylindrical crank chamber is normally closed by a plate 10, in the center of which is arranged a vertically adjustable cap 11, in the under side of which a suitable ball bearing 12 is located. Detachably secured by means of screws 13 to the flange 5 is a planetary gear casing 14, and formed in the center thereof in alinement with the tubular casing 2 is a bearing 15. Formed on the interior of the bottom of this casing 14 in alinement with the ball bearing 12 is a bearing 16, and arranged in the top of the casing 4 in alinement with the bearings 12 and 16 is a ball bearing 17.

The crank shaft 18 of my improved motor is provided on its upper end with a conical shoulder 19, which engages in the ball bearing 12; and said crank shaft is provided with a pair of oppositely arranged cranks 20, which are so spaced as that they travel in horizontal planes directly opposite the two pair of cylinders 3. Arranged between the cranks 20 and formed integral therewith is a pair of eccentrics 21, which are arranged off center relative the crank shaft 18, and one of said eccentrics is slightly in advance of the other. These eccentrics are for the purpose of imparting reciprocatory motion to the valves of the motor. Fixed on the shaft 18, immediately below the lower crank 20, is a bearing ring 22, which engages upon the ball bearing 17; and formed in the periphery of the shaft 18, adjacent the lower end thereof, is a series of gear teeth 23. The extreme lower end of the shaft 18 is reduced in diameter, as indicated by 24, and is journaled for rotation in the bearing 16.

Arranged for movement in each cylinder 3 is a piston 25, and projecting therefrom into the crank shaft chamber is a piston rod 26: Located upon the center of each crank 20 is a split bearing box 27, and each bearing box is connected in any suitable manner to one of each of the pairs of piston rods 26. The rear face of each bearing box 27 is concentrically curved as designated by 28, and formed integral with the side faces of each bearing box are the trunnions 29. Located upon each of the bearing boxes 27 and rotating on the trunnions thereof is a bifurcated bearing box 30, and connected thereto in any suitable manner is the opposite rod of each pair of piston rods 26. These bearing boxes 30 are of such width as that they occupy the entire spaces between the crank arms of each pair of cranks, and the inner faces of said bearing boxes are curved, as designated by 31, to conform to the curved faces 28 of the bearing boxes 27. This arrangement equalizes the strain upon the cranks of the crank shaft, and also equalizes the wear thereupon and upon each other.

Located in the upper end of the tubular casing 2 is a tubular nut 32, and operating therethrough is the feed screw 33 of the motor, the upper end of which is pointed, as indicated by 34, and provided with a pair of oppositely arranged operating handles 35. The lower end of this feed screw is provided with a depending circular lug 36.

Arranged for rotation in the bearing 15 is a tubular tool spindle 37, the upper end of which extends into the lower end of the tubular casing 2, and formed integral with the exterior of this spindle, slightly above the center thereof, are the gear teeth 38. Located immediately above this row of gear teeth is a collar 39, which engages ball bearings 40 located at the lower end of the circular casing 2. Loosely mounted upon the spindle 37, and within the planetary gear casing 14 is a gear wheel 41, which meshes with the teeth 23 on the lower end of the crank shaft 18. Seated in this gear wheel 41, and extending vertically therefrom, and arranged at equal distances apart, are pins 42, the upper ends of which are connected by a ring 43, which surrounds the bearing 39. Arranged for rotation on each pin 42 is a pinion 44, which pinions mesh with the gear teeth 38, and the teeth of an internal gear 45, which is fixed in the lower portion of the casing 4. The parts just described form the planetary gearing of the motor.

Formed integral with and projecting forwardly from the plate 1 on each side of the cylindrical casing 2, and between each pair of cylinders 3 are the horizontally disposed cylindrical valve housings 46, the outer ends of which are closed by plugs 47. Located between these valve housings 46, and immediately in front of the cylindrical casing 2, is a forwardly projecting throttle valve casing 48, which is connected with each of the valve housings 46 by the transversely arranged housing 49. Formed in the lower portion of this housing 49 is a transversely arranged exhaust port 50, the ends of which communicate with exhaust ports 51, which extend along the inside of the valve housings 46 adjacent the outer ends thereof. Formed in the upper portion of the housing 49 is a transversely arranged inlet port 52, the outer ends of which communicate with the openings in the valve housings 46. Rigidly fixed on the interior of each valve housing 46 is a cylindrical bushing 53, and formed through each of said bushings are exhaust ports 54 and 55 which communicate with the ends of the exhaust ports 51. Formed through each bushing 53 on the opposite side from the exhaust ports 54 and 55 are the inlet ports 56 and 57, and each port 56 communicates with the port 58 leading into the outer end of each one of the upper cylinders 3. The opposite ports 57 communicate with the forward ends of ports 59, which are formed in the housing immediately above each of the lower cylinders 3, and said ports 59 communicate at their outer ends with inlet ports 60 which lead into the interior of the lower pair of cylinders 3 adjacent their outer ends. Formed in the tops of the bushings 53 between the inlet and outlet ports therein are ports 61, with which the outer ends of the port 52 communicates. Arranged for reciprocation in each bushing 53 is a valve 62, and formed integral therewith are the stems 63, and formed on said stems are the disks or flanges 64, which operate in the outer ends of the bushings 53. Mounted on each of the eccentrics 21 is a bearing box 65, and adjustably connected thereto are the rods 66, the outer ends of which are pivotally connected to the inner ends of the valves 62. Rigidly fixed within the casing 48 is a bushing 67, and formed in the top thereof is an inlet port 68, which registers with the port 52. Formed in the bottom of this housing is an exhaust port which registers with the exhaust port 50. Arranged for rotation within the bushing 67 is a throttle valve 70, in the upper portion of which is formed a horizontal passage 71, and there being a port 72 for establishing communication between the passage 71 and the port 68. Formed in the under side of this throttle valve is a recess 73, which is normally in communication with the exhaust port 69. Detachably seated in the outer portion of the casing 48 is a tubular handle 74, and arranged for rotation in the outer end thereof is a cylindrical plug 75. Extending through this plug 75 and rigidly fixed therein is a small tube 76, the inner end of which is screw seated in the forward end of the passage 71 in the throttle valve 70. The flexible tube, or other connection that leads the fluid pressure to the motor is attached to the outer end of the tube 76. Formed through the plug 75, below the tube 76, is a series of exhaust openings 77.

The operation of my improved motor is as follows: The tool, such as a drill, or reamer, is located in the socket 37, and the motor is then lifted into position by engaging the handles formed by the tubes 9 and 74. The point 34 of the feed screw 33 is now engaged against a fixed frame, and by operating the handles 35 to rotate the feed screw, the motor is moved downwardly to correspond to the operation of the drill or reamer. Normally the throttle valve 70 stands in such a position as that the port 72 does not register with the inlet port 68; therefore, no fluid pressure can enter the cylinders, and the motor is inoperative as long as the throttle valve occupies this position. To start the motor, the operator manually engages the plug 75, and rotates the same so as to bring the port 72 into a position so that it registers with the inlet port 68, and the fluid pressure through the tube 76 now passes through the ports 72 and 68 into the transverse port or passage 52. Assuming that the valves 62 are in the positions seen in Fig. 3, and that the crank shaft of the motor is rotating in the direction indicated by the arrow in Fig. 3, the fluid pressure from the port 52 passes downwardly through the ports 61 in the bushings 53, between the flanges 64 of the valves 62. The valves 62 slide backwardly and forwardly in the bushings 46 by means of the connecting rods 66 and boxes 65 which are mounted on the eccentrics 21, and one of said eccentrics is mounted slightly in advance of the other, and both of said eccentrics are slightly off center relative to the center of the crank shaft 18. Therefore, said valves do not open and close the corresponding inlet and exhaust ports simultaneously. As both valves are alike in construction and operation, the passage of the air from the throttle valve through one of the valves and its corresponding pair of engine cylinders will be described.

The upper one of the valves 62, seen in Fig. 3, is being moved outwardly through the valve housing, and the inlet port 58 leading to the end of the upper cylinder 3 is just beginning to open; and, as the forward one of the flanges 64 continues to move outwardly, this port will be correspondingly opened, and the fluid pressure between the flanges 64 will pass through ports 56 and 58 into the end of the upper cylinder 3. Thus the fluid pressure is delivered to the upper cylinder to force the piston therein forwardly, and this motion is transmitted by means of the corresponding piston rod 26 to the crank shaft 18. The piston 25 of the lower cylinder 3 on this side of the motor is, during this action, moving outwardly, owing to the arrangement of the cranks on the crank shaft, and, therefore, the fluid pressure in front of said piston will be exhausting through the ports 60 and 59, and from thence through the port 57 which opens simultaneous with the opening of the port 56, and from thence the fluid pressure exhausts through ports 54 and 51, into the transverse port or passage 50; and from thence outwardly through the port 69, recess 73, in the throttle valve, to the interior of the tubular handle 74; and from thence outwardly through the exhaust openings 77.

When the motion of the valve is reversed and it moves forwardly through the valve casing, the travel of the fluid pressure through the ports is reversed, and the fluid pressure from the upper cylinder 3 exhausts through ports 58 and 56; from thence through the ports 55, 51, and 50; and from thence through the throttle valve and tubular handle 74. During this action, the fluid pressure discharges into the lower cylinder 3 on this side of the motor, through ports 57, 59, and 60 to the outer end of said lower cylinder in front of the piston therein. Thus, the crank shaft is continuously rotated at a high rate of speed, and said crank shaft operates freely in the ball bearings 12 and 17, and the bearing 16 in the bottom of the differential gear casing 14. The cap 11 may be adjusted vertically so as to take up any wear on the longitudinal movement that the crank shaft might develop in operation. The gear teeth on the lower end of the crank shaft mesh with and drive the large gear wheel 41, which large gear wheel rotates freely upon the spindle 37. The pins 42 travel around with the large gear wheel 41 and thus carry the pinions 44 which mesh with the internal teeth of the ring 45, and the teeth 38 formed on the spindle 37.

Thus, rotary motion is imparted to said spindle, which operates freely in the bearing 15 and ball bearing 40, and thus drives the tool carried by said spindle.

When it is desired to reverse the motion of the motor, the operator manually engages the plug 75, and reverses the position of the throttle valve 70, so as to bring the port 72 into register with the port 69, and the recess 73 into register with the port 68. Thus, the direction of the flow of the fluid pressure through the valves and ports is reversed, and the direction of rotation of the crank shaft is reversed.

In small machines, where it is desired to operate at a high rate of speed, the planetary gearing may be dispensed with, and the spindle 37 may be rotated by rigidly fixing a gear wheel thereon which meshes direct with the gear teeth 23 on the crank shaft.

A motor of my improved construction is very light, strong, and durable, can be readily shifted from one position to another, and the various parts of the casing can be easily and quickly removed and assembled when the motor is being set up or taken apart, and the operating parts of the motor can be at all times readily inspected, or repaired.

I claim:—

1. In a pneumatic motor of the class described, a main casing, power cylinders formed integral therewith and arranged in pairs, one pair at right angles to the other, a crank chamber casing detachably secured to the main casing, pistons operating in the power cylinders, a crank shaft arranged for operation within the crank chamber casing and to which the pistons are connected, a fixed ball bearing at one end of the main casing in which the crank shaft operates, and an adjustable ball bearing removably seated in the opposite end of the main casing for the opposite end of the crank shaft.

2. In a pneumatic motor of the class described, a main casing, power cylinders formed integral therewith and arranged in pairs, one pair at right angles to the other, cylindrical valve housings formed integral with the main casing between each pair of power cylinders, valves arranged for operation in said valve cylinders for controlling the delivery and exhaust of fluid pressure to and from the power cylinders, a crank chamber casing detachably secured to the main casing, pistons operating in the power cylinders, a crank shaft arranged for operation within the crank chamber casing and to which the pistons are connected, a fixed ball bearing at one end of the main casing in which the crank shaft operates, and an adjustable ball bearing removably seated in the opposite end of the main casing for the opposite end of the crank shaft.

3. In a pneumatic motor of the class described, a main casing, power cylinders formed integral therewith and arranged in pairs, one pair at right angles to the other, cylindrical valve housings formed integral with the main casing between each pair of power cylinders, valves arranged for operation in said valve cylinders for controlling the delivery and exhaust of fluid pressure to and from the power cylinders, a throttle valve arranged for operation between the cylindrical valve housings for controlling the supply and exhaust of fluid pressure to and from said valve housings, a crank chamber casing detachably secured to the main casing, pistons operating in the power cylinders, a crank shaft arranged for operation within the crank chamber casing and to which the pistons are connected, a fixed ball bearing at one end of the main casing in which the crank shaft operates, and an adjustable ball bearing removably seated in the opposite end of the main casing for the opposite end of the crank shaft.

4. In a pneumatic motor of the class described, a main casing, power cylinders formed integral therewith, a cylindrical feed screw casing integral with the main casing, valve casings integral with the main casing between the cylinders, a crank chamber casing detachably secured to the main casing, a crank case cap detachably secured to the main casing, and the crank chamber casing, and a planetary gear casing arranged at the lower end of the main casing.

5. In a pneumatic motor of the class described, a main casing, power cylinders formed integral therewith, a cylindrical feed screw casing integral with the main casing, valve casings integral with the main casing between the cylinders, a crank chamber casing detachably secured to the main casing, a crank case cap detachably secured to the main casing, and the crank chamber casing, a planetary gear casing arranged at the lower end of the main casing, a handle projecting outwardly from the main casing, and a handle projecting outwardly from the crank chamber casing.

6. In a pneumatic motor of the class described, a main casing, power cylinders formed integral therewith and arranged in pairs, one pair at right angles to the other, a crank chamber casing detachably secured to the main casing, pistons operating in the power cylinders, a crank shaft arranged for operation in the crank chamber casing and to which the pistons are connected, a tubular feed screw casing integral with the main casing, a feed screw operating therein, a tool spindle arranged for rotation in the lower portion of the main casing beneath the feed screw casing, a driving connection between the crank shaft and the tool spindle, a pair of handles arranged on opposite sides of the main casing, and a throttle valve arranged at the inner end of one of the handles for controlling the supply of fluid pressure to the power cylinders.

7. In a pneumatic motor of the class described, a main casing, power cylinders formed integral therewith and arranged in pairs, one pair at right angles to the other, a crank chamber casing detachably secured to the main casing, pistons operating in the power cylinders, a crank shaft arranged for operation in the crank chamber casing and to which the pistons are connected, a tubular feed screw casing integral with the main casing, a feed screw operating therein, a tool spindle arranged for rotation in the lower portion of the main casing beneath the feed screw casing, a driving connection between the crank shaft and the tool spindle, valve housings arranged on opposite sides of the feed screw casing and between the pairs of power cylinders for controlling the supply and exhaust of fluid pressure to said power cylinders, a pair of handles arranged on opposite sides of the main casing, and a throttle valve arranged at the inner end of one of the handles for controlling the supply of fluid pressure to the controlling valves.

In testimony whereof, I have signed my name to this specification, in presence of two subscribing witnesses.

WILLIAM F. ROTHE.

Witnesses:
 MARTIN P. SMITH,
 E. M. HARRINGTON.